US012109904B2

(12) United States Patent
Seroff et al.

(10) Patent No.: US 12,109,904 B2
(45) Date of Patent: Oct. 8, 2024

(54) RESILIENT CHARGING STATION

(71) Applicant: SPEED CHARGE, LLC, Carter Lake, IA (US)

(72) Inventors: Nicholas Seroff, San Jose, CA (US); Tabish Shibly, Oakland, CA (US)

(73) Assignee: SPEED CHARGE, LLC, Carter Lake, IA (US)

( * ) Notice: Subject to any disclaimer, the term of this patent is extended or adjusted under 35 U.S.C. 154(b) by 0 days.

(21) Appl. No.: 18/069,043

(22) Filed: Dec. 20, 2022

(65) Prior Publication Data

US 2024/0198835 A1   Jun. 20, 2024

(51) Int. Cl.
| | |
|---|---|
| B60L 53/62 | (2019.01) |
| B60L 53/16 | (2019.01) |
| H01M 10/625 | (2014.01) |
| H01M 10/63 | (2014.01) |
| H02J 7/00 | (2006.01) |
| H02J 9/06 | (2006.01) |
| B60L 53/53 | (2019.01) |

(52) U.S. Cl.
CPC .............. *B60L 53/62* (2019.02); *B60L 53/16* (2019.02); *H01M 10/625* (2015.04); *H01M 10/63* (2015.04); *H02J 7/0013* (2013.01); *H02J 7/0063* (2013.01); *H02J 7/00712* (2020.01); *H02J 9/062* (2013.01); *B60L 53/53* (2019.02); *B60L 2210/30* (2013.01); *B60L 2210/44* (2013.01); *H02J 2207/20* (2020.01); *H02J 2300/22* (2020.01)

(58) Field of Classification Search
CPC ................ B60L 53/53; B60L 53/302

USPC .......................................... 320/109
See application file for complete search history.

(56) References Cited

U.S. PATENT DOCUMENTS

| | | |
|---|---|---|
| 8,054,039 B2 | 11/2011 | Bauerle et al. |
| 11,584,250 B1 | 2/2023 | Palombini |
| 2012/0074901 A1 | 3/2012 | Mohammed et al. |
| 2013/0113413 A1 | 5/2013 | Harty et al. |
| 2015/0054466 A1 | 2/2015 | Kinomura et al. |

(Continued)

OTHER PUBLICATIONS

International Search Report and Written Opinion for Application No. PCT/US2022/038802, dated Jan. 19, 2023.

(Continued)

*Primary Examiner* — Daniel Kessie
*Assistant Examiner* — Dru M Parries
(74) *Attorney, Agent, or Firm* — MARSHALL, GERSTEIN & BORUN LLP

(57) ABSTRACT

In order to ensure continued charging of electric vehicles when a charging station is not currently received an input power from an external power source, the systems and methods disclosed herein provide for operation of the charging station in a resilient operating mode in which an operating current is derived from a charge previously stored in a battery of the charging station. The operating current is produced by a resilient power subsystem within the charging station using the stored charge and is provided by the resilient power subsystem to one or more system components within the charging station in order to enable continued operation of the charging station, including enabling continuing vehicle charging during a time interval in which the charging station is not receiving input power from an external power source.

20 Claims, 6 Drawing Sheets

(56) References Cited

U.S. PATENT DOCUMENTS

| | | |
|---|---|---|
| 2016/0006253 A1 | 1/2016 | Saussele et al. |
| 2016/0009191 A1 | 1/2016 | Becker et al. |
| 2016/0152151 A1 | 6/2016 | Yang et al. |
| 2016/0193932 A1* | 7/2016 | Vaghefinazari ....... H02J 7/0013 320/109 |
| 2019/0389315 A1 | 12/2019 | Zhu |
| 2020/0031238 A1 | 1/2020 | Kydd |
| 2020/0321797 A1 | 10/2020 | Gerrits |
| 2021/0039516 A1 | 2/2021 | Bromback et al. |
| 2021/0170897 A1 | 6/2021 | Ellis |
| 2022/0194241 A1* | 6/2022 | Gonring ................ B60L 53/302 |
| 2023/0033955 A1 | 2/2023 | Seroff et al. |

OTHER PUBLICATIONS

Ray et al. "Modeling and power management of electric vehicle charging system." 2021 International Conference on Smart-Green Technology in Electrical and Information Systems (ICSGTEIS). IEEE, 2021.

* cited by examiner

RESILIENT CHARGING STATION

TECHNICAL FIELD

At least one aspect generally relates to improvements to vehicle charging stations generally and more particularly to improvements enabling vehicle charging stations to continue operation when disconnected from an electric power grid or other external power source.

BACKGROUND

Charging stations provide electric power to electric vehicles (EVs), including plug-in hybrid vehicles, that can operate without the use or with limited use of hydrocarbon-based fuels. Installation of conventional charging stations typically requires improvements to infrastructure including upgrades to electrical service and construction of suitable housing. The costs, planning, and time required to install these charging systems can be a deterrent to potential commercial or residential operators. To reduce the installation and operating requirements associated with traditional charging stations, some charging stations include batteries to store energy received from a power source (such as an electric utility power grid) over an extended time interval. While such charging stations are thus enabled to charge EVs at a faster rate, an external power source is still needed to provide power to the controllers, display screens, sensors, temperature control systems, and various other components of the charging stations. Thus, despite including batteries that store power to charge EVs, such charging stations nonetheless become inoperative if their external power source fails or becomes disconnected. Therefore, improved systems and techniques for ensuring resilient operation of charging stations are needed in order to continue vehicle charging despite temporary unavailability of external power sources.

SUMMARY

The systems, methods, and computer-readable instructions disclosed herein solve the problem of ensuring resilient operation of a charging station through the use of a resilient power subsystem configured to provide power to system components of the charging station during temporary disconnection or other unavailability of an external power source. As described herein, a vehicle charging system for charging a vehicle is provided, the vehicle charging system comprising: (i) a power input port configured to receive alternating current (AC) input electric power from a power source at a first voltage ($V_1$); (ii) one or more batteries configured to receive a direct current (DC) input current derived from the AC input electric power received at the power input port and store electric power from the DC input current; (iii) a vehicle coupling configured to receive a DC charging current at a second voltage ($V_2$) derived from the one or more batteries and to provide an electrical interconnect between the vehicle charging system and the vehicle in order to provide the DC charging current to the vehicle; (iv) a resilient power subsystem configured to provide an AC operating current at a third voltage ($V_3$) derived from the electric power stored in at least one of the one or more batteries to a plurality of system components within the vehicle charging system, wherein the system components are configured to control operation of the vehicle charging system; and (v) a system controller comprising one or more processors configured to control operation of the vehicle charging system, which system controller may be one of the plurality of system components. In some embodiments, the system controller controls resilient operation of the vehicle charging system by obtaining a controller operating current derived from the electric power stored in the one or more batteries during a time interval in which the AC input electric power is not being received from the power source and controlling the vehicle charging system to provide the DC charging current to the electrical interconnect to charge the vehicle during the time interval. The plurality of system components may comprise a plurality of temperature control components configured to maintain an internal temperature of the vehicle charging system within an operating range, such as coolant pumps, fans, or heating elements.

In some embodiments, the resilient power subsystem comprises an operating current rectifier configured to generate the controller operating current as a DC current from the AC operating current. In further embodiments, the resilient power subsystem comprises a bidirectional inverter configured to: (i) in a first operating mode, convert the AC input power from the power source into the DC input current and (ii) in a second operating mode, convert a DC output current from the one or more batteries into the AC operating current. In some such embodiments, the resilient power subsystem is configured to provide the AC operating current by controlling the bidirectional inverter to operate in the second operating mode. In yet further embodiments, the resilient power subsystem comprises an inverter configured to convert a DC output current from the one or more batteries into the AC operating current.

In further embodiments, the vehicle charging system comprises a rectifier configured to receive the AC input electric power and provide the DC input current to the one or more batteries. In various embodiments, the vehicle charging system further comprises a primary power subsystem configured to provide the AC operating current to the plurality of system components during a second time interval in which the AC input electric power is being received from the power source. In some such embodiments, the primary power subsystem comprises an AC bus or a step-down converter to provide the AC operating current from the AC input electric power. In further such embodiments, the system controller is configured to: (i) obtain the controller operating current derived from AC input electric power from the primary power subsystem during the second time interval; (ii) detect a triggering condition indicating the AC input electric power is not being received from the power source at the beginning of the time interval; and (iii) cause the resilient power subsystem to begin providing the AC operating current during the time interval in response to detecting the triggering condition. In yet further embodiments, the one or more batteries include a backup battery configured to store a charge at the third voltage ($V_3$), and the resilient power subsystem is configured to produce the AC operating current from the charge stored in the backup battery.

In still further embodiments, the vehicle charging system comprises an inverter configured to convert a DC output current from the one or more batteries into an AC resilient power current at the first voltage ($V_1$), wherein the third voltage ($V_3$) is less than the first voltage ($V_1$) satisfy the following condition. In some such embodiments, the vehicle charging system additionally comprises a step-down transformer configured to (i) receive the AC resilient power current at the first voltage ($V_1$) and convert it into the AC operating current at the third voltage ($V_3$) during the time interval and (ii) receive the AC input electric power at the first voltage ($V_1$) and convert it into the AC operating current at the third voltage ($V_3$) during a second time interval in which the AC input electric power is being received from the power source.

Methods or computer-readable media storing instructions for implementing all or part of the vehicle charging system described above may also be provided in some aspects in order to provide or operate a vehicle charging station. According to some aspects, an exemplary method for charging a vehicle by a vehicle charging system comprises: receiving an AC input electric power from a power source at a first voltage ($V_1$) at a power input port of the vehicle charging system during a first time interval; charging one or more batteries of the vehicle charging system using a DC input current derived from the AC input electric power received at the power input port by storing a charge in the one or more batteries during the first time interval in which the AC input electric power is being received from the power source; determining occurrence of a triggering condition by a system controller of the vehicle charging system. the triggering condition indicating the AC input electric power is not being received from the power source; and in response to determining occurrence of the triggering condition, controlling the vehicle charging system by the system controller during a second time interval in which the AC input electric power is not being received from the power source to: (i) provide a DC charging current at a second voltage ($V_2$) derived from the one or more batteries to the vehicle via a vehicle coupling in order to charge a vehicle battery of the vehicle and (ii) provide an AC operating current at a third voltage ($V_3$) by a resilient power subsystem, the AC operating current being derived from the electric power stored in at least one of the one or more batteries to a plurality of system components within the vehicle charging system, wherein the system components are configured to control operation of the vehicle charging system. Additional or alternative features described herein may be included in some aspects.

DETAILED DESCRIPTION

The techniques disclosed herein generally relate to solving the problem of ensuring continued operation of an electric vehicle charging station when the charging station is temporarily disconnected from an external power source or when the power source is otherwise unavailable. In order to ensure resilient operation during time intervals in which an input electric power is not received from an external power source, the vehicle charging station includes a resilient power subsystem configured to convert a charge stored in one or more batteries of the charging station into one or more operating currents, which operating currents are supplied by the resilient power subsystem to various system components within the charging station in order to enable continued operation of the charging station. Such operating currents may be alternating current (AC) or direct current (DC) operating currents in various embodiments. Since the charging station is configured to charge vehicles using the charge stored in its batteries, the charge station is thus enabled to continue operating to charge vehicles even when it is not drawing power from the external power source. Additional or alternative features are described in further detail below.

Several aspects of electric vehicle (EV) or plug-in hybrid vehicle charging systems will now be presented with reference to various embodiments. Although described herein as relating to EVs, it should be understood that the techniques may be applied equally to plug-in hybrid vehicles or other wholly or partially battery-powered devices that may be charged by a high-voltage or high-power charging station. Charging stations are used for recharging batteries in EVs by supplying AC or DC power to EVs. In turn, the charging stations receive an input electric power supplied by an external power source, such as a utility power grid connection or local power source (e.g., solar, wind, water, or hydrocarbon-powered power generation systems). The charging stations described herein store power in one or more internal or connected batteries in order to smooth power consumption over time. In addition to using such stored power to charge EVs, the charging stations are further configured to use such stored power to provide one or more operating currents to system components within the charging stations when operating in a resilient operating mode during a time interval in which an input electric power is not being receive from an external power source.

Figure 1:
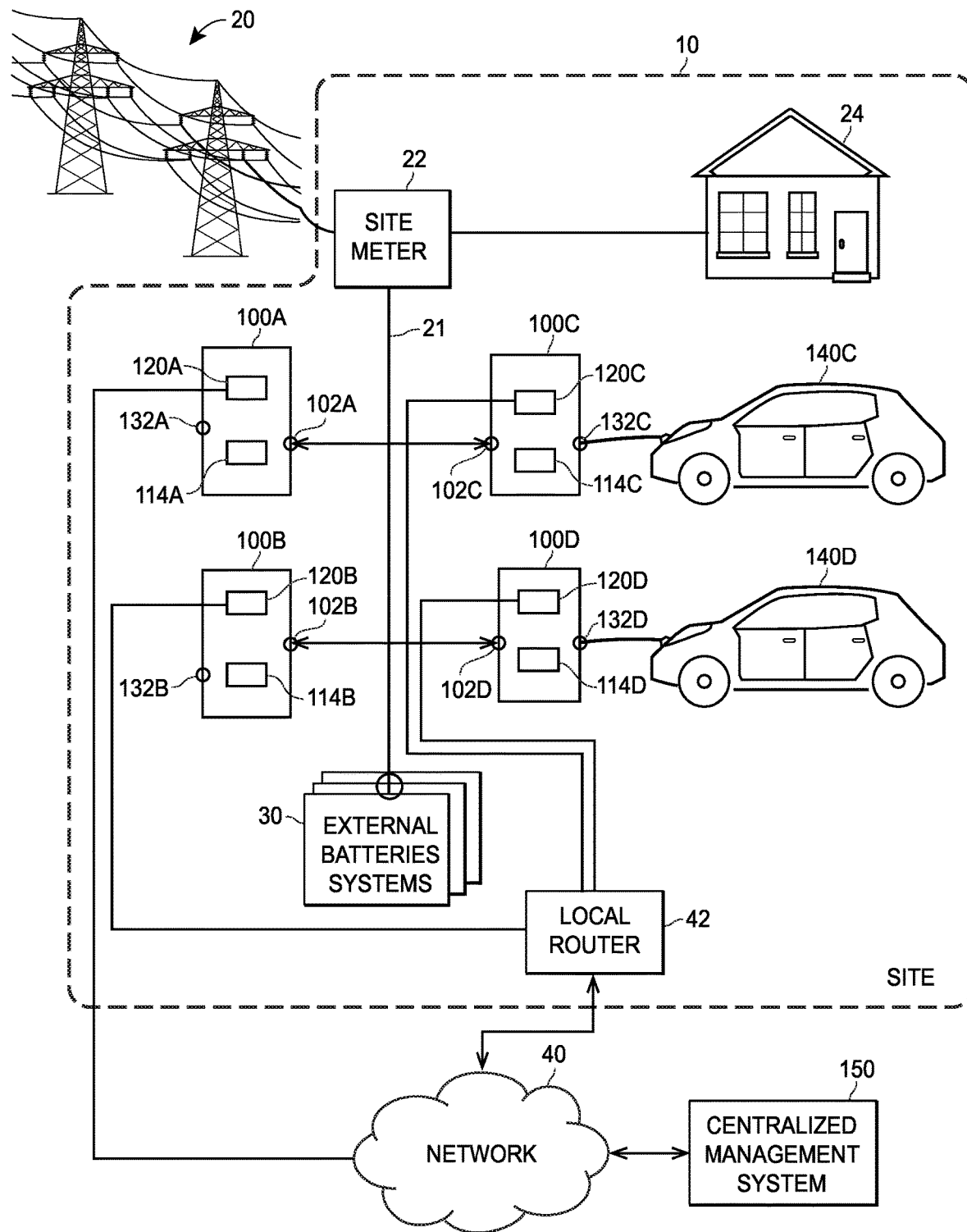
FIG. 1 illustrates a block diagram of an example of a charging site having multiple vehicle charging systems powered by an electric power grid in accordance with certain aspects disclosed herein.

FIG. 1 illustrates a block diagram of an example of a charging site 10 with multiple EV charging systems 100A-D1. The charging site 10 is supplied with AC power from an electric power grid 20 via a local AC circuit 21 and a site meter 22, which records power consumption and connects the various electrical components disposed at the charging site 10 to the electric power grid 20. Thus, the electric power grid 20 provides AC power to each of the EV charging systems 100A-D and other electrical components via the site meter 22, including providing AC power to a non-charging load 24 (e.g., commercial building electrical infrastructure) at the charging site 10. In some embodiments, the site meter 22 is a smart meter including additional control logic and communication functionality. For example, the site meter 22 may be configured to communicate with one or more external servers (not show) and/or the centralized management system 150 to obtain demand data regarding load on or demand charges for AC power from the electric power grid 20. In some such embodiments, the site meter 22 may be configured to disconnect part or all of the loads from the electric power grid 20 upon the occurrence of certain conditions (e.g., during peak hours or when the power grid is unstable due to high demand). In this way, the site meter 22 may be used to separate the local AC circuit 21 of the charging site 10 from the electric power grid 20 when needed. Although only one site meter 22 is shown, some embodiments may include a plurality of meters, each of which may perform part or all of the operation of the site meter 22. Such embodiments may be implemented to facilitate more targeted control of operations of individual EV charging systems 100 or non-charging loads 24 at the charging site 10.

The AC power from the site meter 22 is provided as an AC input electric power to the respective input ports 102A-D of the EV charging systems 100A-D via one or more wired AC connections of the local AC circuit 21. In some embodiments, the AC input electric power is received at each of the input ports 102A-D as a 120V or 240V single-phase or three-phase AC power supply. As discussed elsewhere herein, each of the EV charging systems 100A-D converts and stores such AC input electric power to DC power stored in batteries of respective energy storage modules 114A-D, from which charging currents may be provided to vehicles via vehicle couplings 132A-D of the EV charging systems 100A-D. The EV charging systems 100A-D are controlled by respective system controllers 120A-D, which monitor operating data of the respective EV charging systems 100A-D and control charging and discharging of the energy storage modules 114A-D.

In some embodiments, the DC power may be stored in the energy storage modules 114A-D over an interval of time in order to provide charging current to EVs via respective vehicle couplings 132A-D at a faster rate than the AC input electric power is received by the EV charging systems 100A-D. While this has significant advantages in reducing the electrical infrastructure requirements for the charging site 10, some of the EV charging systems 100A-D may be used more that others. For example, EV charging systems 100C and 100D may experience greater use due to closer proximity to a destination (e.g., by being located in a parking lot at locations nearer an entrance to a commercial building). As illustrated, vehicles 140C and 140D may be connected to EV charging systems 100C and 100D by vehicle couplings 132C and 132D, respectively, in order to receive charging currents from energy stored in the energy storage modules 114C and 114D, while no vehicles are charging at EV charging systems 100A and 100B. Thus, the batteries of EV charging systems 100C and 100D will discharge faster than those of EV charging systems 100A and 100B, resulting in a charge imbalance among the energy storage modules 114A-D. To address such an imbalance, in some embodiments, energy may be transferred from EV charging systems 100A and 100B to EV charging systems 100C and 100D via the local AC circuit 21. In some embodiments, one or more external battery systems 30 are also connected to the local AC circuit 21 to store energy and provide it to the EV charging systems 100A-D at a later time, which external battery systems 30 may include controllers (not shown) or may be controlled by a centralized management system 150. Similarly, in various embodiments, charge transfers may be determined and controlled by the system controllers 120A-D of the EV charging systems 100A-D or by a centralized management system 150. To facilitate such control decisions, each of the system controllers 120A-D may be connected via wired or wireless communication connections with the other system controllers 120A-D and/or with the centralized management system 150 to exchange electronic messages or signals.

The centralized management system 150 may communicate with each of the EV charging systems 100A-D in order to monitor operating data regarding the EV charging systems 100A-D and to determine control actions to be implemented by the EV charging systems 100A-D as needed. The centralized management system 150 may be located at the charging site 10 or at a location remote from the charging site 10. When remote from the charging site 10, the centralized management system 150 may be communicatively connected to the EV charging systems 100A-D via a network 40, which may be a proprietary network, a secure public internet, a virtual private network, or some other type of network, such as dedicated access lines, plain ordinary telephone lines, satellite links, cellular data networks, or combinations of these. In various embodiments, the EV charging systems 100A-D may be communicatively connected with the network 40 directly or via a local router 42. In some embodiments in which the centralized management system 150 is located at the charging site 10, the centralized management system 150 may be combined with or incorporated within any of the EV charging systems 100A-D. In still further embodiments, the centralized management system 150 may be configured as a local cloud or server group distributed across the system controllers 120A-D of the EV charging systems 100A-D in order to provide robust control in the event of a network disruption.

In some embodiments, the centralized management system 150 may also communicate with remote EV charging systems that are deployed in locations remote from the charging site 10, which locations may be separated by large geographic distances. For example, the centralized management system 150 may communicate with EV charging systems 100 located in different parking facilities, on different floors of the same parking structure, or in different cities. Such centralized management system 150 may comprise one or more servers configured to receive operating data from and to send data and/or control commands to each of the EV charging systems 100A-D. To facilitate communication, the centralized management system 150 may be communicatively connected to the system controllers 120A-D of the EV charging systems 100A-D via an electronic communication link with a communication interface module (not shown) within each of the EV charging systems 100A-D.

The centralized management system 150 may group or relate EV charging systems according to their location, their intended function, availability, operating status, and capabilities. The centralized management system 150 may remotely configure and control the EV charging systems, including the EV charging systems 100A-D. The centralized management system 150 may remotely enforce regulations or requirements governing the operation of the EV charging systems 100A-D. The centralized management system 150 may remotely interact with users of the EV charging systems 100A-D. The centralized management system 150 may remotely manage billing, maintenance, and error detection for each of the EV charging systems 100A-D. For example, error conditions resulting in manual disconnection of a vehicle from any of the EV charging systems 100A-D may be reported by such EV charging system to the centralized management system 150 for analysis. The centralized management system 150 may also communicate with mobile communication devices of users of the EV charging systems 100A-D, such as mobile communication devices or other computing devices used by operators of the EV charging systems 100A-D to enable the operator to self-configure the EV charging systems 100A-D, charge pricing, language localization, currency localization, and so on. Operation of the centralized management system 150 in relation to charge transfers between the EV charging systems 100A-D is further described elsewhere herein.

Figure 2A:
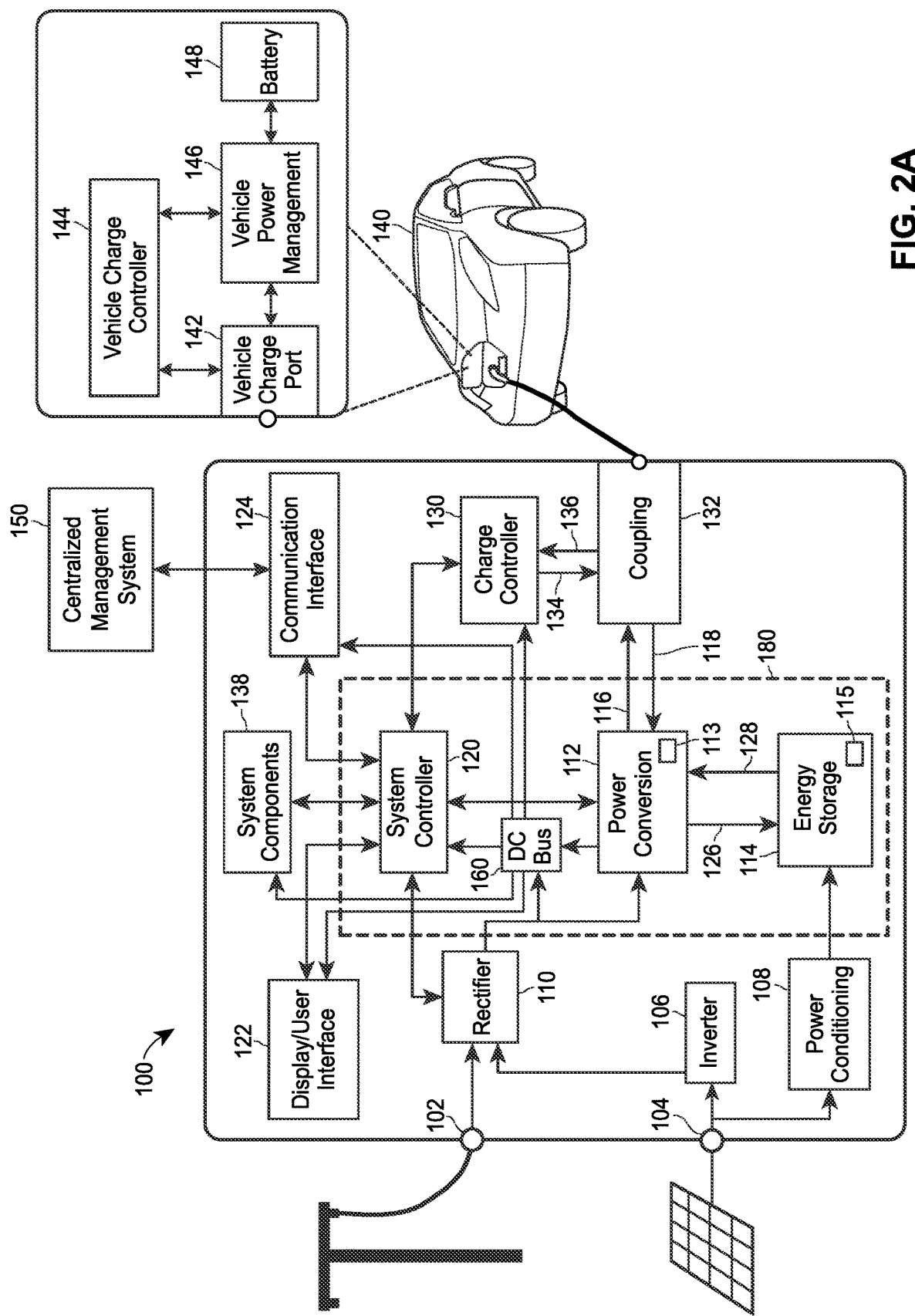
FIGS. 2A-C illustrate block diagrams of various examples of an electric vehicle charging system configured for resilient vehicle charging in accordance with certain aspects disclosed herein.

FIG. 2A illustrates a block diagram of an example of an EV charging system 100 configured in accordance with certain aspects disclosed herein. The EV charging system 100 may be any of the EV charging systems 100A-D at the charging site 10 illustrated in FIG. 1. The EV charging system 100 is configured to receive electric power from a power source (e.g., electric power grid 20) at a first voltage ($V_1$) via an input port 102 or 104 in order to charge an energy storage module 114 (e.g., one or more batteries), from which the EV charging system 100 provides a charging current at a second voltage ($V_2$) to a vehicle 140 in order to charge a battery 148 of the vehicle 140. Such charge is provided through a vehicle coupling 132, which may comprise a charging cable utilizing one or more standard connector types (e.g., Combined Charging System (CCS) or Charge de Move (CHaDEMO) connectors). Various system components are disposed within the EV charging system 100 to perform aspects of operation of the EV charging system 100, each of which system components is configured to operating using an AC or DC operating current at a third voltage ($V_3$) that may differ between system components. A system controller 120 receives a DC controller operating current at a third voltage ($V_3$) and implements control logic to monitor operating data and control operation of the EV charging system 100. Although the illustrated EV charging system 100 is illustrated as communicating with a centralized management system 150, alternative embodiments of the EV charging system 100 need not be configured for such external communication. Additional or alternative components and functionality may be included in further alternative embodiments of charging systems.

The EV charging system 100 includes a rectifier 110 having one or more circuits configurable to transform, condition, or otherwise modify AC input power received from an input port 102 or 104 to provide DC power to a power conversion module 112. The input power received at input ports 102 or 104 may be received from an electric power grid 20, a local power generator (e.g., a solar panel or a wind turbine), or any other power source. In some embodiments, AC input electric power is received at an AC input port 102, while input DC power is received at a DC input port 104 (e.g., from photovoltaic cells or other types of DC power sources). The DC input port 104 may be connected to one or more of an inverter module 106 or a power conditioning module 108 for the input DC power. In further embodiments, DC current received via DC input port 104 is converted to an AC current by an inverter module 106, and the AC current is then provided to the rectifier 110. The rectifier 110 may convert and combine AC currents received from multiple sources. In some embodiments, multiple rectifiers 110 may direct DC current derived from multiple sources to individual circuits or sections of the power conversion module 112. In further embodiments, DC current received via DC input port 104 may instead be provided to a power conditioning module 108 that may include voltage level converting circuits, filters, and other conditioning circuits to provide a charging current to the energy storage module 114.

The power conversion module 112 includes some combination of one or more DC-to-DC converters for efficient conversion of DC input current received from the rectifier 110 to a DC energy storage current 126 provided to the energy storage module 114, which stores the power until needed to provide a charging current 116 to a vehicle 140. In some embodiments, the power conversion module 112 includes an DC-to-DC conversion circuit that generates a DC energy storage current 126 that is provided to an energy storage module 114 at a voltage different from that of the AC input power received from at input port 102 from the power source. Additionally or alternatively, the rectifier 110 may include one or more AC-to-DC conversion circuits to generate a DC current at any desirable voltage from an AC input electric power. In some embodiments, the power conversion module 112 comprises one or more DC-to-DC converters (e.g., step-up converters, step-down converters, or buck-boost converters) to provide the energy storage current 126 at a voltage that is different from the first voltage ($V_1$) at which the input power is received at input port 102 or 104 or the voltage of the DC input current received from the rectifier 110.

The energy storage module 114 comprises one or more batteries configured to store a charge received from the power conversion module 112 or the power conditioning module 108. In some embodiments, the one or more batteries may be configured to store the charge at a fourth voltage ($V_4$) that is different from the first voltage ($V_1$) at which the input power is received at input port 102 or 104. Such fourth voltage ($V_4$) may be greater than the third voltage ($V_3$) at which the system components operate and less than the second voltage ($V_2$) at which the charging current is provided to a vehicle 140. The energy storage module 114 may further comprise a battery management system to monitor and manage the charge stored by the one or more batteries. In some embodiments, the energy storage module 114 may comprise a plurality of high-capacity batteries storing energy for charging vehicles and a backup battery 115 storing energy for powering various system components of the EV charging system 100 during a resilient operating mode without receiving input power from an external power source. Such backup battery 115 may store a charge at a voltage different from that of the voltage at which the other batteries of the energy storage module 114 store their charge. For example, in order to improve efficiency, the backup battery 115 may store its charge at an operating voltage of the system components to be powered by such backup battery 115.

In further embodiments, the energy storage module 114 includes high-capacity batteries that have a storage capacity greater than a multiple of the storage capacity in the EVs to be charged (e.g., three times, five times, or ten times an expected vehicle battery capacity). The storage capacity of the energy storage module 114 may be configured based on the expected average charge per charging event, which may depend upon factors such as the types of vehicles charged, the depletion level of the vehicle batteries when charging starts, and the duration of each charging event. For example, a retail parking site may have more charging events of shorter duration, while a commuter train parking lot may have fewer charging events of longer duration. In various embodiments, the storage capacity of the energy storage module 114 may be configured based on maximum expected charging offset by power received from an electric utility. In some embodiments, the storage capacity of each of the energy storage modules 114 of the EV charging systems 100 and any external battery systems 30 at a charging site 10 may be configured to ensure a total charge stored at the charging site 10 is sufficient for an expected maximum load due to vehicle charging. In further embodiments, the power received from an electric utility may be limited to power available during low-demand times, such as off-peak or low-priced periods of the day. One or more switches (not shown) at the input ports 102 or 104 may be operable by the system controller 120 to disconnect inflows of power during peak or high-priced periods of the day. In some embodiments, the rectifier 110 may be configured to enable power reception during peak periods to ensure continued operation of the EV charging system 100 when power levels in the energy storage module 114 are unexpectedly low.

In some embodiments, the power conversion module 112 may include one or more DC-to-DC conversion circuits that receive DC current 128 at the fourth voltage ($V_4$) from the energy storage module 114 and drive a charging current 116 to a vehicle 140 through a vehicle coupling 132 to supply a vehicle 140 with the charging current 116 at the second voltage ($V_2$) via a vehicle charge port 142. The vehicle coupling 132 serves as an electrical interconnect between the EV charging system 100 and the vehicle 140. In various embodiments, such vehicle coupling 132 comprises a charging head and/or a charging cable. For example, the vehicle coupling 132 may comprise a charging cable having a standard-compliant plug for connection with a vehicle charge port 142 of vehicles 140. The vehicle coupling 132 may include both a power connection for carrying the charging current 116 and a communication connection for carrying electronic communication between the charge controller 130 and the vehicle 140. In some embodiments, the EV charging system 100 may comprise multiple vehicle couplings 132, and the power conversion module 112 may include a corresponding number of DC-to-DC conversion circuits specific to each of the multiple couplings. According to some embodiments, the power conversion module 112 may be further configured to receive a reverse current 118 from a vehicle 140 via the vehicle coupling 132, which reverse current 118 may be used to provide a DC energy storage current 126 to add energy to the energy storage module 114. In some embodiments, the power conversion module 112 includes one or more inverters that convert the DC current 128 to an AC current that can be provided to various system components of the EV charging system 100, such as the system components 138. In further embodiments, the power conversion module 112 may further include one or more DC-to-DC converters configured to provide a DC operating current to various system components of the of the EV charging system 100, such as the system controller 120 or the system components 138.

A charge controller 130 controls the charging current 116 and/or reverse current 118 through each vehicle coupling 132. To control charging or discharging of the vehicle 140, the charge controller 130 comprises one or more logic circuits (e.g., general or special-purpose processors) configured to execute charging control logic to manage charging sessions with vehicle 140. Thus, the charge controller 130 is configured to communicate with the system controller 120 to control the power conversion module 112 to provide the charging current 116 to the vehicle 140 or to receive the reverse current 118 from the vehicle 140 via the vehicle coupling 132. In some instances, the charge controller 130 may include power control circuits that further modify or control the voltage level of the charging current 116 passed through the vehicle coupling 132 to the vehicle 140. The charge controller 130 also communicates via the vehicle coupling 132 with a vehicle charge controller 144 within the vehicle 140 to manage vehicle charging. Thus, the charge controller 130 communicates with the vehicle charge controller 144 to establish, control, and terminate charging sessions according to EV charging protocols (e.g., CCS or CHaDEMO). The charge controller 130 may be communicatively connected with the vehicle coupling 132 to provide output signals 134 to the vehicle charge controller 144 and to receive input signals 136 from the vehicle charge controller 144.

A system controller 120 is configured to control operations of the EV charging system 100 by implementing control logic using one or more general or special-purpose processors. The system controller 120 is configured to monitor and control power levels received by the rectifier 110 from the power source, power levels provided from the rectifier 110 to the power conversion module 112, power levels provided to the energy storage module 114 by the power conversion module 112, power levels output through the charging current 116, and energy levels in the energy storage module 114. The system controller 120 is further configured to communicate with and control each of the one or more charge controllers 130, as well as controlling the power conversion module 112. For example, the system controller 120 is configured to control the power conversion module 112 and the charge controller to supply a charging current 116 to the vehicle coupling 132 in response to instructions from the charge controller 130. The system controller 120 is also configured to control communication with the centralized management system 150 via control of the communication interface module 124 and, in some embodiments, aspects of operation of the system controller 120 may be controlled by commands received in electronic messages from the centralized management system 150 via the communication interface module 124.

The system controller 120 is also configured to communicate with other various system components 138 of the EV charging system 100 (e.g., other controllers or sensors coupled to the energy storage module 114 or other components of the EV charging system 100) in order to receive operating data and to control operation of the system via operation of such system components 138. For example, the system components 138 may include a plurality of temperature control components (e.g., internal or external temperature sensors, coolant pumps, fans, or heater elements) configured to maintain an internal temperature of the EV charging system 100 within an operating range to avoid damage to or inefficient operation of the batteries of the energy storage module 114. Thus, the system controller 120 may monitor temperatures within the EV charging system 100 using the system components 138 and may be further configured to mitigate increases in temperature through active cooling or power reductions using the same or different system components 138. Likewise, the system controller 120 communicates with a user interface module 122 (e.g., a touchscreen display) and a communication interface module 124 (e.g., a network interface controller) to provide information and receive control commands. The communication interface module 124 may be configured to send and receive electronic messages via wired or wireless data connections, which may include portions of one or more digital communication networks.

The system controller 120 is configured to communicate with the components of the EV charging system 100, including rectifier 110, power conversion module 112, the user interface module 122, the communication interface module 124, the charge controller 130, and the system components 138 over one or more data communication links. The system controller 120 may also be configured to communicate with external devices, including a vehicle 140 via the vehicle coupling 132, one or more additional EV charging systems via the centralized management system 150, or a site meter 22 (either directly or indirectly via a local router 42 or via the centralized management system 150). The system controller 120 may manage, implement or support one or more data communication protocols used to control communication over the various communication links, including wireless communication or communication via a local router 42. The data communication protocols may be defined by industry standards bodies or may be proprietary protocols.

The user interface module 122 is configured to present information related to the operation of the EV charging system 100 to a user and to receive user input. The user interface module 122 may include or be coupled to a display with capabilities that reflect intended use of the EV charging system 100. In one example, a touchscreen may be provided to present details of charging status and user instructions, including instructions describing the method of connecting and disconnecting a vehicle 140. The user interface module 122 may include or be coupled to a touchscreen that interacts with the system controller 120 to provide additional information or advertising. The system controller 120 may include or be coupled to a wireless communication interface that can be used to deliver a wide variety of content to users of the EV charging system 100, including advertisements, news, point-of-sale content for products/services that can be purchased through the user interface module 122. The display system may be customized to match commercial branding of the operator, to accommodate language options, or for other purposes. The user interface module 122 may include or be connected to various input components, including touchscreen displays, physical input mechanisms, identity card readers, touchless credit card readers, and other components that interact through direct connections or wireless communications. The user interface module 122 may further support user authentication protocols and may include or be coupled to biometric input devices such as fingerprint scanners, iris scanners, facial recognition systems, or the like.

In some embodiments, the energy storage module 114 is provisioned with a large battery pack, and the system controller 120 executes software to manage input received from a power source to the battery pack based upon demand level data (e.g., demand or load data from an electric power grid 20 or site meter 22), such that power is drawn from the power source to charge the battery pack at low-load time periods and to avoid drawing power from the grid during peak-load hours. The software may be further configured to manage power output to provide full, fast charging power in accordance with usage data generated by monitoring patterns of usage by the EV charging system 100. The use of historical information can avoid situations in which the battery pack becomes fully discharged or depleted beyond a minimum energy threshold. For example, charging may be limited at a first time based upon a predicted later demand at a second time, which later demand may be predicted using historical information. This may spread limited charging capacity more evenly among vehicle throughout the course of a day or in other situations in which battery pack capacity is expected to be insufficient to fully charge all EVs over a time interval, taking account of the ability to add charge to the energy storage module 114.

In further embodiments, the system controller 120 executes software (either separately or in coordination with the centralized management system 150) to manage energy draw and use by controlling charging and discharging over time among multiple EV charging systems 100 at the charging site 10. Thus, the charge drawn from the power source may be limited or avoided during peak-load hours by using the charge previously stored in the batteries of the energy storage module 114 to charge vehicles 140 and to provide operating current to the various system components (e.g., the system controller 120, the charge controller 130, the power conversion module 112, the user interface module 122, the communication interface module 124, and the system components 138) without drawing power from the power source (e.g., the electric power grid 20). As noted above, in some embodiments, the charging site 10 may include one or more external battery systems 30 connected to the local AC circuit 21, which may also supply power to the EV charging system 100 without simultaneously drawing power from the power source (e.g., the electric power grid 20). In such embodiments, the systems controller 120 and/or the centralized management system 150 may further manage energy inflow and outflow of the EV charging system 100 by controlling selective charging and discharging of the batteries at appropriate time periods to avoid or reduce total power draw of the EV charging system 100 from the power source during peak-demand or other high-demand times by charging the batteries of the EV charging system 100 and any external battery systems 30 during low-demand times. In some embodiments, the system controller 120 or the centralized management system 150 may receive site data indicating total load at the charging site 10 from the site meter 22 and thus control charging and discharging of the energy storage module 114 within site-wide limits during peak-demand or other high-demand times.

In some embodiments, the EV charging system 100 may be configured with two or more vehicle couplings 132 to enable concurrent charging of multiple vehicles 140. The system controller 120 may be configured by a user via the user interface module 122 to support multiple modes of operation and may define procedures for charge transfer or power distribution that preserve energy levels in the energy storage module 114 when multiple vehicles 140 are being concurrently charged. Charge transfers may be used to transfer power from EV charging systems 100 that have available power or are not being used to charge a vehicle 140 to EV charging systems 100 that are charging one or more vehicles 140. Distribution of power may be configured to enable fast charging of one or more vehicles 140 at the expense of other vehicles 140. In this regard, the vehicle couplings 132 may be prioritized or the system controller 120 may be capable of identifying and prioritizing connected vehicles 140. In some instances, the system controller 120 may be configured to automatically control the respective charge controllers 130 to split available power between two vehicles 140 after the second vehicle 140 is connected. The available power may be evenly split between two vehicles 140 or may be split according to priorities or capabilities. In some examples, the system controller 120 may conduct arbitration or negotiation between connected vehicles 140 to determine a split of charging capacity. A vehicle 140 may request a charging power level at any given moment based on temperature, battery charge level, and other characteristics of the vehicle 140 and its environment and to achieve maximum charge rate and minimum charging time for the current circumstances.

As illustrated, a vehicle 140 may be charged by connecting the vehicle 140 to the EV charging system 100 via a vehicle coupling 132. This may include plugging a charging cable of the EV charging system 100 into a vehicle charge port 142 of the vehicle 140. The vehicle charge port 142 is configured to receive the charging current 116 through the vehicle coupling 132 and provide such received current to a vehicle power management module 146. The vehicle charge port 142 is further configured to provide an electronic communication connection between the vehicle coupling 132 and a vehicle charge controller 144, which controls charging of the vehicle 140. The vehicle power management module 146 is controlled by the vehicle charge controller 144 to provide power to each of one or more batteries 148 of the vehicle 140 in order to charge such battery 148. In some instances, the vehicle charge port 142 includes a locking mechanism to engage and retain a portion of the vehicle coupling 132 in place during charging sessions. For example, for safety reasons, the vehicle charge controller 144 may control a locking mechanism of the vehicle charge port 142 to lock a plug of a charging cable in the vehicle charge port 142 while a charging session is active.

The EV charging system 100 also includes a resilient power subsystem 180 to enable resilient operation of the EV charging system 100 during time intervals in which power is not being drawn from the external power source (e.g., when the EV charging system 100 is disconnected from the electric power grid 20, when the electric power grid 20 is experiencing a grid failure, or when the system controller 120 prevents the EV charging system 100 from drawing power from the electric power grid 20 due to high demand on the grid or otherwise). The resilient power subsystem 180 is configured to provide an operating current to the various system components required for continued operation of the EV charging system 100 derived from the charge stored in one or more batteries of the energy storage module 114, rather than providing the operating current derived from an input power received from an external power source at input port 102 or 104. The operating current provided by the resilient power subsystem 180 is a DC operating current at the third voltage ($V_3$) at which the system components operate. For example, the system controller 120, user interface module 122, communication interface module 124, charge controller 130, and other system components 138 may be configured to operate using a 24V DC operating current. In some embodiments, more than one operating currents may need to be supplied to the various system components, in which case a plurality of power conversion circuits (e.g., a plurality of step-down converters 113) within the power conversion module 112 may be used to provide multiple operating currents at difference voltages. For example, the system controller 120 may require a 1.2V DC operating current, while temperature control components of the system components 138 may require a 24V DC or 110V AC operating current. Thus, the multiple operating currents may be provided to different system components.

The resilient power subsystem 180 comprises at least some elements of the power conversion module 112, the energy storage module 114, the system controller 120, and a DC bus 160. The power conversion module 112 is configured with one or more resilient power conversion circuits to receive a DC current from the energy storage module 114 at the fourth voltage ($V_4$) and convert it into a DC operating current at the third voltage ($V_3$), which is less than the second voltage ($V_2$) of the charging current 116. Such resilient power conversion circuits may comprise step-down converters, step-up converters, or buck-boost converters configured to produce the DC operating current at the desired voltage from the DC current 128. In some embodiments, the power conversion module 112 particularly comprises a step-down converter 113 configured specifically to produce the DC operating current at the third voltage ($V_3$) from the DC current 128 at the fourth voltage ($V_4$) from one or more batteries of the energy storage module 114. In embodiments in which multiple DC operating currents at different voltages are provided to different system components, the power conversion module 112 may include a plurality of such step-down converters 113 to provide the DC operating currents at the different voltages. As noted above, the resilient power subsystem 180 may include a backup battery 115 of the energy storage module 114, which backup battery 115 may store a charge at a lower voltage than the other batteries of the energy storage module 114 in order to better match the voltage requirements of the system components. In some embodiments, the DC operating current is provided to the various system components (e.g., the system controller 120, the user interface module 122, the communication interface module 124, the charge controller 130, and the system components 138) via a DC bus 160 that receives the DC operating current from the power conversion module 112. In embodiments in which multiple operating currents at different voltages are provided to different system components, a plurality of DC busses 160 may be used to provide the various operating currents.

As illustrated, the resilient power subsystem 180 may comprise a combination of components within the EV charging system 100 that perform additional functions not limited to ensuring resilient operation by providing an operating current derived from charge stored in one or more batteries of the energy storage module 114. In some embodiments, however, the resilient power subsystem 180 may be composed of a set of components, modules, and connections that are distinct from or separate from those of a primary power subsystem that provides the operating current derived from an input power received from the power source during times when the input power is being received from the power source. Thus, in some embodiments, the system controller 120 may be configured to control the provision of operating current to other system components within the EV charging system 100, both during a primary operating mode while power is being received from the power source and during a resilient operating mode while power is not being received from the power source. Controlling the EV charging system 100 in a primary operating mode may comprise causing the primary power subsystem to provide the operating current to the system components during a time interval in which an input electric power is being received at input port 102 or 104 from an external power source. The primary power system derives the operating current from the input electric power received from the power source. For example, in the primary operating mode, a DC operating current may be provided to the various system components from the rectifier 110 via the DC bus 160. Controlling the EV charging system 100 in a resilient operating mode may comprise causing the resilient power subsystem 180 to derive the operating current from a charge stored in one or more batteries of the energy storage module 114 and provide the operating current to the various system components. For example, the step-down converter 113 of the power conversion module 112 may provide a DC operating current to the various system components via the DC bus 160 in the resilient operating mode. A plurality of switches (not shown) may be disposed within the EV charging system 100 to enable the system controller 120 to control operation of the system in either the primary operating mode or the resilient operating mode.

Figure 2B:
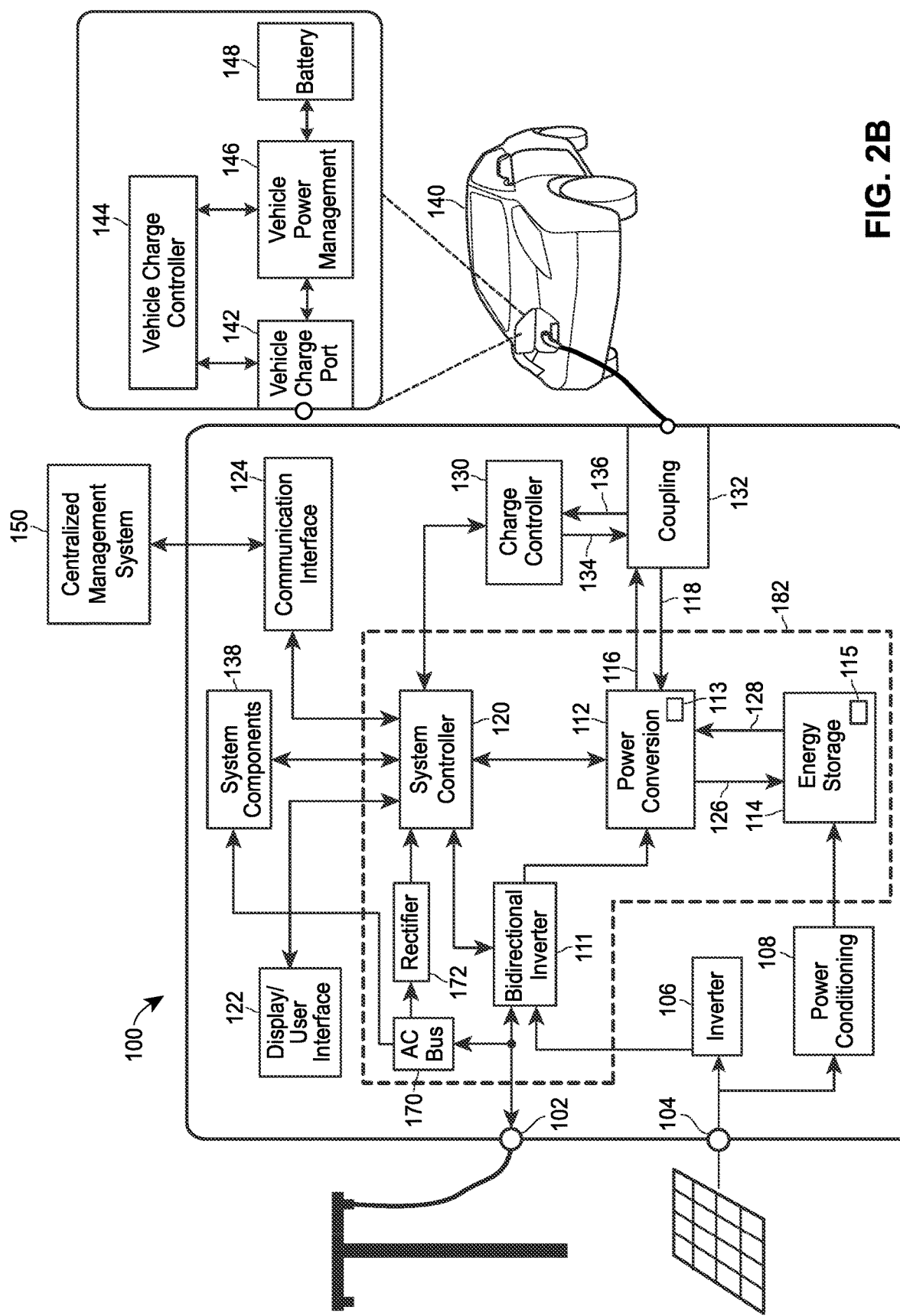

FIG. 2B illustrates a block diagram of an alternative example of the EV charging system 100 configured in accordance with certain aspects disclosed herein. While otherwise the same as the EV charging system 100 of FIG. 2A, the EV charging system 100 of FIG. 2B includes an alternative embodiment of the resilient power subsystem 182 that provides an AC operating current at a third voltage ($V_3$) to at least some of the system components (e.g., system components 138), which includes a bidirectional inverter 111 that replaces the rectifier 110. Providing an AC operating current may be desirable in order to utilize AC system components that operate more efficiently in the primary operating mode. Since the EV charging system 100 is expected to be powered by an external power source during ordinary conditions, it may be preferable to use some system components configured to receive an AC operating current, even it such configuration is less efficient when operating in the resilient operating mode.

The resilient power subsystem 182 comprises a bidirectional inverter 111, a power conversion modules 112, an energy storage module 114, a system controller 120, and an AC bus 170. In some embodiments, the resilient power subsystem 182 further comprises a rectifier 172 to provide a DC controller operating current to the system controller 120, such that the DC controller operating current is derived from the AC operating current produced by the bidirectional inverter 111 from the charge stored in one or more batteries of the energy storage module 114. Alternatively, the power conversion module 112 (or a step-down converter 113 thereof) may provide the DC controller operating current to the system controller 120. Additional or alternative components and functionality may be included in further alternative embodiments of charging systems.

The bidirectional inverter 111 is configured to alternatively operate in an inverter mode or in a rectifier mode at various times as controlled by the system controller 120. In the rectifier mode, the bidirectional inverter 111 converts an AC input electric power current from a power source (e.g., the electric power grid 20) into a DC input current to provide to the energy storage module 114 via the power conversion module 112. In the inverter mode, the bidirectional inverter 111 converts a DC output current from one or more batteries of the energy storage module 114 (e.g., backup battery 115) via the power conversion module 112 into an AC operating current at the third voltage ($V_3$) to provide to AC system components via the AC bus 170. Thus, when a triggering condition occurs to cause the EV charging system 100 to provide the AC operating current to the system components, the system controller 120 controls the bidirectional inverter 111 to operate in the inverter mode to convert a DC current received from one or more batteries of the energy storage module 114 into an AC current that is provided to the AC bus 170. In some embodiments, a plurality of separate components may instead be configured to perform such functionality of the bidirectional inverter 111, such as by retaining the rectifier 110 and adding a separate inverter 174 (as illustrated in the resilient power subsystem 184 of FIG. 2C). In further embodiments, part or all of the functionality of the bidirectional inverter 111 may be incorporated into the power conversion module 112, or part or all of the functionality of the power conversion module 112 may be incorporated into the bidirectional inverter 111. In some embodiments, multiple bidirectional inverters 111 may be used or the bidirectional inverter 111 may include circuits to provide multiple AC operating currents having different voltages required by different system components.

In addition to providing the AC operating current to the AC system components, in some embodiments, the bidirectional inverter 111 may further provide an AC output current at the input port 102, which may be provided to other EV charging systems 100A-D or a non-charging load 24 at the charging site 10 via the local AC circuit 21. For example, one EV charging system 100A may provide the AC output current via local AC circuit 21 to the other EV charging systems 100B-D, thus enabling operation of such other EV charging systems 100B-D without the need for internal generation of AC operating current from their respective energy storage modules 114B-D. Such an arrangement may be used to improve efficiency at charging sites 10 having multiple EV charging systems 100A-D.

The AC bus 170 is configured to provide the AC operating current to various system components within the EV charging system 100, such as system components 138 configured to operate using an AC current. As with the DC bus 160, multiple AC busses 170 may be included in embodiments in which multiple AC operating currents are provided at different voltages. The AC bus 170 may further provide the AC operating current to a rectifier 172 in order to provide a DC operating current to the system controller 120 or other DC system components. For example, the rectifier 172 may be configured to convert the AC operating current into a DC controller operating current used by the system controller 120 and/or the charge controller 130. In further embodiments, the step-down converter 113 or other circuits of the power conversion module 112 may provide the DC controller operation current to the controller. In various embodiments, the rectifier 172 (or power conversion module 112) may provide the DC operating current to additional DC system components, or the system controller 120 may provide a DC operating current to other DC system components.

Figure 2C:
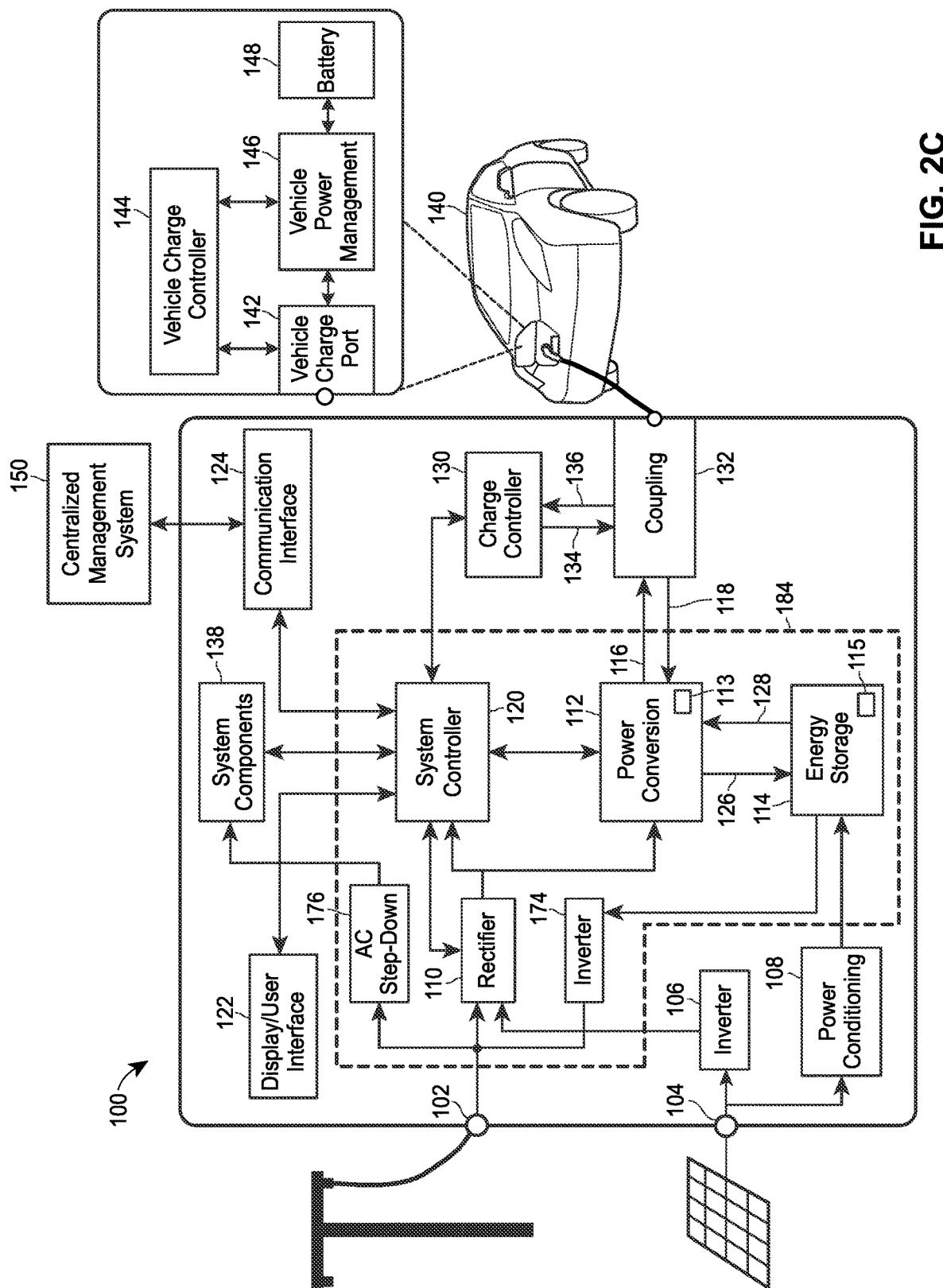

FIG. 2C illustrates a block diagram of another alternative example of the EV charging system 100 configured in accordance with certain aspects disclosed herein. While otherwise the same as the EV charging system 100 of FIGS. 2A-B, the EV charging system 100 of FIG. 2C includes an alternative embodiment of the resilient power subsystem 184 that provides an AC operating current at a third voltage ($V_3$) to at least some of the system components (e.g., system components 138), using an inverter 174 that is separate from the rectifier 110. The rectifier 110 receives the AC input electric power from the power source at input port 102 and provides the DC input current to the power conversion module 112, which is then used to charge the batteries of the energy storage module 114. The inverter 174 is later used to provide the AC operating current from the charge stored in one or more batteries of the energy storage module 114.

The resilient power subsystem 184 comprises a rectifier 110, a power conversion modules 112, an energy storage module 114, a system controller 120, and an inverter 174. In some embodiments, the resilient power subsystem 184 further comprises an AC step-down converter 176 (e.g., a transformer) to provide the AC operating current at the third voltage ($V_3$) to the AC system components (e.g., one or more system components 138 configured to operate using an AC current). The rectifier 110 also receive the AC current provided from the inverter 174, thus enabling the rectifier to operate the same in both a primary operating mode and a resilient operating mode to provide the DC operating current. In the resilient operating mode, however, the power conversion module 112 prevents charging the batteries of the energy storage module 114 using the DC input current provided by the rectifier 110. Additional or alternative components and functionality may be included in further alternative embodiments of charging systems.

The inverter 174 is configured to receive a DC output current from one or more batteries of the energy storage module 114 (e.g., backup battery 115), either directly or from the power conversion module 112. The inverter 174 converts such DC output current into an AC current and provides such AC current to an electrical connection between the input port 102 and the rectifier 110. Such AC current may be an AC resilient power current provided at the first voltage ($V_1$) equivalent to that of the AC input electric power from the power source. In some embodiments, the AC system components are configured to operate using the AC input electric power at the first voltage ($V_1$) from the power source, such that the AC operating current at the at the third voltage ($V_3$) is equivalent to the AC input electric power at the first voltage ($V_1$). In such embodiments, such system components receive the AC operating current at the at the third voltage ($V_3$) from the inverter 174. Although not shown, one or more AC busses similar to the AC bus 170 may be included to provide the AC operating power.

In some embodiments, an AC step-down converter 176 is provided between the input port 102 and the AC system components (e.g., system components 138). Such step-down converter may be configured to receive (i) the AC resilient power current at the first voltage ($V_1$) and convert it into the AC operating current at the third voltage ($V_3$) during time intervals in which the AC input electric power is not being received from the power source and (ii) receive the AC input electric power at the first voltage ($V_1$) and convert it into the AC operating current at the third voltage ($V_3$) during other time intervals in which the AC input electric power is being received from the power source. Thus, the AC step-down converter 176 operates as a primary power subsystem to provide the AC operating current to the AC system components when the EV charging system 100 is operating in the primary operating mode and as a part of the resilient power subsystem 184 when the EV charging system 100 is operating in the resilient operating mode.

The rectifier 110 also receives the AC current from the inverter 174 and converts the AC current from the inverter 174 into a DC operating current, such as the controller operating current provided to the system controller 120, such that the DC operating current is derived from the AC current produced by the inverter 174 from the charge stored in one or more batteries of the energy storage module 114. Alternatively, the power conversion module 112 (or a step-down converter 113 thereof) may provide the DC controller operating current to the system controller 120. In various embodiments, the rectifier 110 (or power conversion module 112) may provide the DC operating current to additional DC system components, or the system controller 120 may provide a DC operating current to other DC system components.

Exemplary Methods for Resilient Operation of Charging Systems

Figure 3:
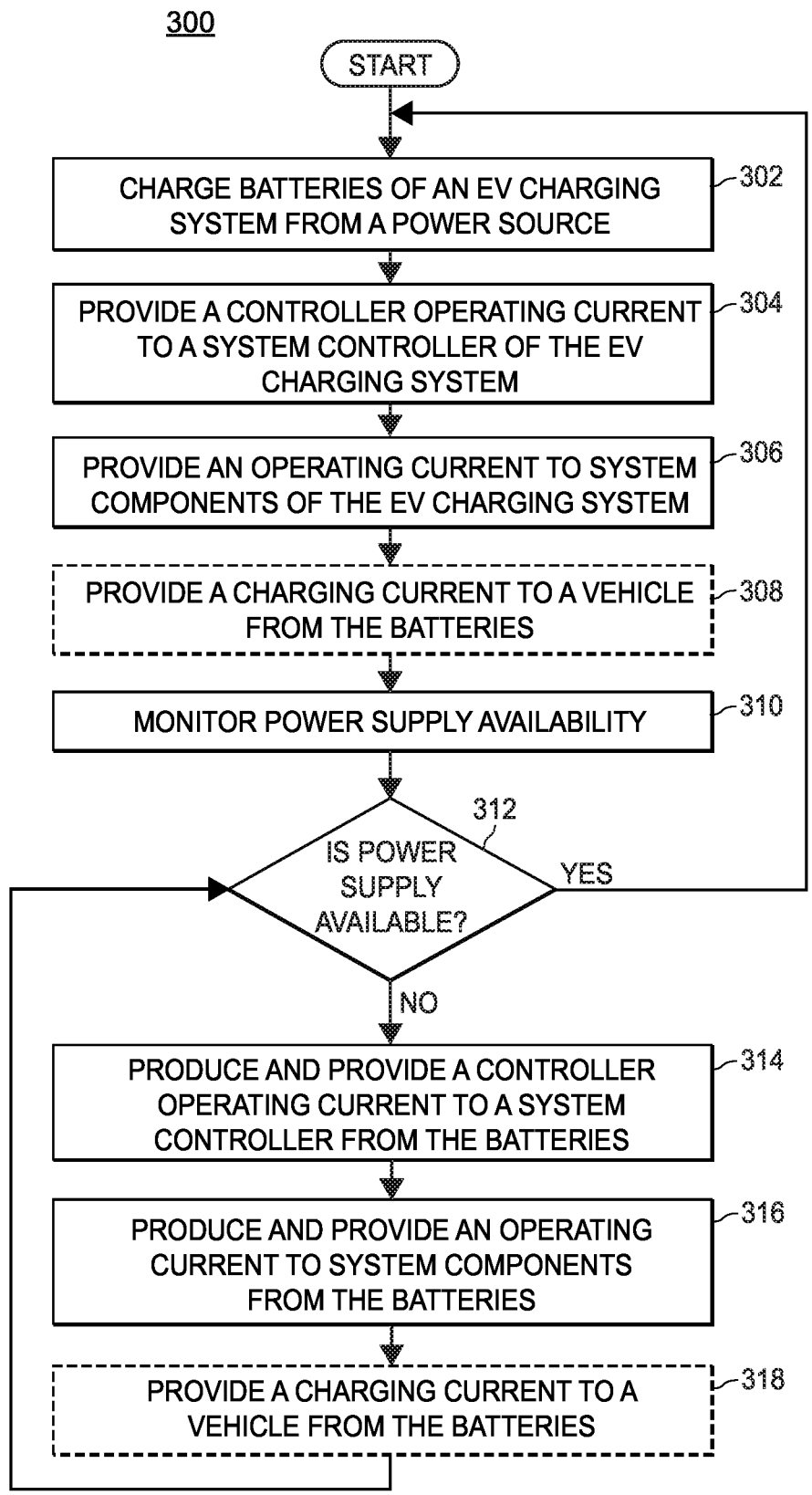
FIG. 3 illustrates a flow diagram of an example resilient charging method for operating a resilient charging system to continue vehicle charging despite disconnection from or failure of a power source in accordance with certain aspects disclosed herein.

FIG. 3 illustrates a flow diagram of an example resilient charging method 300 for operating a resilient charging system to continue vehicle charging despite disconnection from or failure of a power source in accordance with certain aspects disclosed herein. The resilient charging system may be any of the EV charging systems 100 described herein or other similar EV charging systems configured to power internal system components from one or more batteries used to provide a charging current to vehicles in a resilient operating mode while the EV charging systems are not obtaining an AC input electric power from an external power source. The resilient charging method 300 may be implemented by a system controller 120 of an EV charging system 100 controlling operation of a resilient power subsystem 180, 182, or 184 of the EV charging system 100.

The example resilient charging method 300 provides power to system components of an EV charging system in two modes. Blocks 302-310 represent operation in a primary operating mode of the EV charging system during which an input electric power is being received from a power source external to the EV charging system. At decision block 312, it is determined whether the power source is available to supply the input electric power. When the power source is not available, the EV charging system operates in a resilient operating mode to provide power derived from one or more batteries of the EV charging system to the system components while the input electric power is not being received from the power source. The resilient charging method 300 begins with charging one or more batteries of the EV charging system using an input electric power from the power source (block 302). The input electric power is further used to provide a controller operating current to the system controller of the EV charging system (block 304) and to provide an operating current to other system components of the EV charging system (block 306). When a vehicle is present to charge, the EV charging system further provides a charging current derived from the charge stored in its one or more batteries to the vehicle (block 308). The EV charging system further monitors the availability of the power supply (block 310) in order to determine whether the power supply is available (block 312). If the power supply continues to be available, the method 300 continues charging the batteries at block 302. If the power supply is not available, the EV charging system switches from the primary operating mode to the resilient operating mode and provides a controller operating current derived from the one or more batteries of the EV charging system to the system controller (block 314). The charge previously stored in the one or more batteries is further used to provide an operating current to the other system components (block 316). Powering the various system components in the resilient operating mode further enables the EV charging system to provide a charging current to a vehicle during a time when the input electric power is not being received from the power source (block 318). Additional or alternative aspects may be included in some embodiments.

At block 302, the EV charging system 100 receives an input electric power from an external power source (e.g., AC power from the electric power grid 20). As discussed above, the input electric power is converted by one or more of a rectifier 110 or bidirectional inverter 111 and a power conversion module 112, then provided to the energy storage module 114 to charge the one or more batteries of the energy storage module 114. In some embodiments, the power source provides an AC or DC input electric power at a lower first voltage ($V_1$) than a second voltage ($V_2$) of the output charging current used to charge vehicles 140. Therefore, charging the batteries of the EV charging systems may occur slowly over a substantially longer time than discharging occurs. As noted above, the system controller 120 may control provision of the DC current 126 to the energy storage module 114, which may include a backup battery 115.

At block 304, the EV charging system 100 provides a controller operating current to the system controller 120 in the primary operating mode during a time interval in which the input electric power is being received by the EV charging system from the power source. In some embodiments, the controller operating current is provided as a DC operating current at a third voltage ($V_3$) to the system controller 120 by a primary power subsystem of the EV charging system 100 configured to provide a DC operating current derived from the input electric power received from the power source when operating in the primary operating mode. Thus, in some embodiments, the system controller 120 receives the DC operating current from the rectifier 110 (either directly or via DC bus 160) or from the rectifier 172, each of which receives the AC input electric power from the power source at input port 102 while operating in the primary operating mode.

At block 306, the EV charging system 100 provides an operating current to the system components 138 (and, in some embodiments, to other system components) in the primary operating mode during the time interval in which the input electric power is being received by the EV charging system from the power source. The operating current may include an AC operating current and/or a DC operating current at a third voltage ($V_3$), according to various embodiments described herein. In some embodiments, the operating current is provided to the system components (e.g., system components 138) by a primary power subsystem of the EV charging system 100 configured to provide an operating current derived from the input electric power received from the power source when operating in the primary operating mode. Thus, in some embodiments, the system components 138 receive a DC operating current from a DC bus 160 supplied with the DC operating current from the rectifier 110 of the primary power subsystem, which converts the AC input electric power received from the power source at input port 102 into the DC operating current while operating in the primary operating mode. In further embodiments, the system components 138 receive an AC operating current from an AC bus 170 or an AC step-down converter 176 of the primary power subsystem, which is connected to the input port 102 to receive the AC input electric power from the power source while operating in the primary operating mode.

At block 308, in some instances, the EV charging system 100 provides a charging current 116 at the second voltage ($V_2$) to a vehicle 140 a coupling 132 during the time interval in which the input electric power is being received by the EV charging system from the power source. To charge the vehicle 140, the system controller 120 causes the power conversion module 112 (either directly or indirectly) to receive the DC current 128 from one or more batteries of the energy storage module 114 and provide the charging current 116 to the coupling 132. The charge controller 130 controls provision of the charging current 116 to the vehicle charge port 142 of the vehicle 140. Operation of the charge controller 130 may be controlled by the system controller 120. In various embodiments, both the system controller 120 and the charge controller 130 receive the DC controller operating current provided by the primary power subsystem as described above, either directly or indirectly. For example, the charge controller 130 may receive the DC controller operating current from the system controller 120.

At block 310, the system controller 120 of the EV charging system 100 monitors the power supply to determine availability of the power supply. In some embodiments, the system controller 120 may detect power source availability based upon sensor data received from one or more sensors disposed within the EV charging system 100. For example, the system controller 120 may detect the power source is unavailable by detecting no power is being received (e.g., no voltage is detected) at any input ports 102 or 104 using one or more sensors. In further embodiments, the system controller 120 may obtain power source data regarding the power source from the site meter 22 or the centralized management system 150. Such power source data may include an indication of whether the power source is available (e.g., whether the electric power grid 20 is connected and powered to provide electric power to the charging site 10), or such power source data may further include demand data regarding load on or demand charges for the power source.

At block 312, the system controller 120 determines whether the power source is available. In some embodiments, determining whether the power source is available may comprise determining whether a triggering condition associated with power source unavailability has occurred. Determining occurrence of such triggering condition may comprise detecting the EV charging system 100 is not receiving an input electric power from the power source at the time of the triggering condition (e.g., the electric power grid 20 is down or disconnected). In some embodiments, occurrence of the triggering condition may be determined based upon the power source data regarding the power source. In some embodiments, the centralized management system 150 determines occurrence of a triggering condition, then sends a command to one or more of the EV charging systems in an electronic message to the EV charging system 100 to cause the EV charging system 100 to enter a resilient operating mode. In various embodiments, occurrence of the triggering condition may include detection of disconnection of the power source from the EV charging system 100, or determining occurrence of the triggering condition may include determining a demand level for the power source exceeds a threshold demand level (e.g., determining the load or demand charges of the electric power grid 20 exceeding thresholds associated with high demand relative to supply of power to the grid). If such demand level is determined to exceed the threshold demand level, the system controller 120 may control the EV charging system 100 to stop drawing the input electrical power from the power source (e.g., by operating a switch within the EV charging system 100 or the site meter 22 to disconnect from the power source). An indication of such demand level or an indication that the demand level exceeds to the threshold demand level may be received from the site meter 22, from a server or controller associated with the power source, or from the centralized management system 150.

When the system controller 120 determines the power source is available (e.g., determines that no triggering event indicating unavailability has occurred), the system controller 120 causes the EV charging system 100 to continue to operate in the primary operating mode at block 302, in which primary operating mode the EV charging system 100 continues to draw the input electric power from the power source. When the system controller 120 determines the power source is not available (e.g., determines that a triggering event indicating unavailability has occurred), the system controller 120 causes the EV charging system 100 to operate instead in the resilient operating mode, in which resilient operating mode the EV charging system 100 does not draw an input electric power from the power source. To begin or continue operating in the resilient operating mode, the system controller 120 controls the resilient power subsystem 180, 182, or 184 to provide one or more operating currents derived from a charge stored in one or more batteries of the energy storage module 114 to the system components (e.g., by providing a controller operating current to the system controller 120 and an AC or DC operating current to other system components 138).

At block 314, the system controller 120 causes the resilient power subsystem 180, 182, or 184 to produce and provide a controller operating current at the third voltage ($V_3$) derived from a charge stored in one or more batteries of the energy storage module 114 to the system controller 120 during the time interval in which the input electric power is not being received by the EV charging system from the power source. In some embodiments, the resilient power subsystem 180, 182, or 184 produces and provides the DC controller operating current to the system controller 120 by providing a DC operating current to a DC bus 160 using a step-down converter 113 or other conversion circuits of the power conversion module 112 to convert a DC current 128 received from one or more batteries of the energy storage module 114 (which may include a backup battery 115). In further embodiments, the resilient power subsystem 182 produces and provides the DC controller operating current to the system controller 120 by providing an AC operating current to an AC bus 170 using a bidirectional inverter 111 to convert a DC current 128 received from one or more batteries of the energy storage module 114 (which may include a backup battery 115) via the power conversion module 112 into the AC operating current, then using a rectifier 172 to convert the AC operating current to the DC controller operating current provided to the system controller 120. In yet further embodiments, the resilient power subsystem 184 produces and provides the DC controller operating current to the system controller 120 by providing an AC resilient power current to an input port 102 using an inverter 174 to convert a DC current received from one or more batteries of the energy storage module 114 (which may include a backup battery 115) into the AC resilient power current, from which AC resilient power current a rectifier 110 then produces and provides the DC controller operating current to the system controller 120.

At block 316, the system controller 120 causes the resilient power subsystem 180, 182, or 184 to produce and provide an operating current at the third voltage ($V_3$) derived from a charge stored in one or more batteries of the energy storage module 114 to the system components 138 (and, in some embodiments, to other system components) during the time interval in which the input electric power is not being received by the EV charging system from the power source. The operating current may include an AC operating current and/or a DC operating current, according to various embodiments described herein. In some embodiments, the resilient power subsystem 180, 182, or 184 produces and provides a DC operating current to the system components 138 by providing a DC operating current to a DC bus 160 using a step-down converter 113 or other conversion circuits of the power conversion module 112 to convert a DC current 128 received from one or more batteries of the energy storage module 114 (which may include a backup battery 115). In further embodiments, the resilient power subsystem 182 produces and provides an AC operating current to the system components 138 (and, in some embodiments, to other system components) via an AC bus 170 by using a bidirectional inverter 111 to convert a DC current 128 received from one or more batteries of the energy storage module 114 (which may include a backup battery 115) via the power conversion module 112 into the AC operation current. In yet further embodiments, the resilient power subsystem 184 produces and provides an AC operating current to the system components 138 (and, in some embodiments, to other system components) by providing an AC resilient power current to an input port 102 using an inverter 174 to convert a DC current received from one or more batteries of the energy storage module 114 (which may include a backup battery 115) into the AC resilient power current. In some such embodiments, the AC resilient power current may be the AC operating current. In alternative such embodiments, the AC operating current is derived from the AC resilient power current by an AC step-down converter 176 that produces and provides the AC operating current to the system components 138 from the AC resilient power current. In some embodiments, combinations of the resilient power subsystems 180, 182, or 184 may be used to provide both AC and DC operating currents to different system components of the EV charging system 100.

At block 318, in some instances, the EV charging system 100 provides a charging current 116 at the second voltage ($V_2$) to a vehicle 140 a coupling 132 during the time interval in which the input electric power is not being received by the EV charging system from the power source. To charge the vehicle 140, the system controller 120 causes the power conversion module 112 (either directly or indirectly) to receive the DC current 128 from one or more batteries of the energy storage module 114 and provide the charging current 116 to the coupling 132. The charge controller 130 controls provision of the charging current 116 to the vehicle charge port 142 of the vehicle 140. Operation of the charge controller 130 may be controlled by the system controller 120. In various embodiments, both the system controller 120 and the charge controller 130 receive the DC controller operating current provided by the resilient power subsystem 180, 182, or 184 as described above, either directly or indirectly. For example, the charge controller 130 may receive the DC controller operating current from the system controller 120.

Additional Description Related to Controllers

Figure 4:
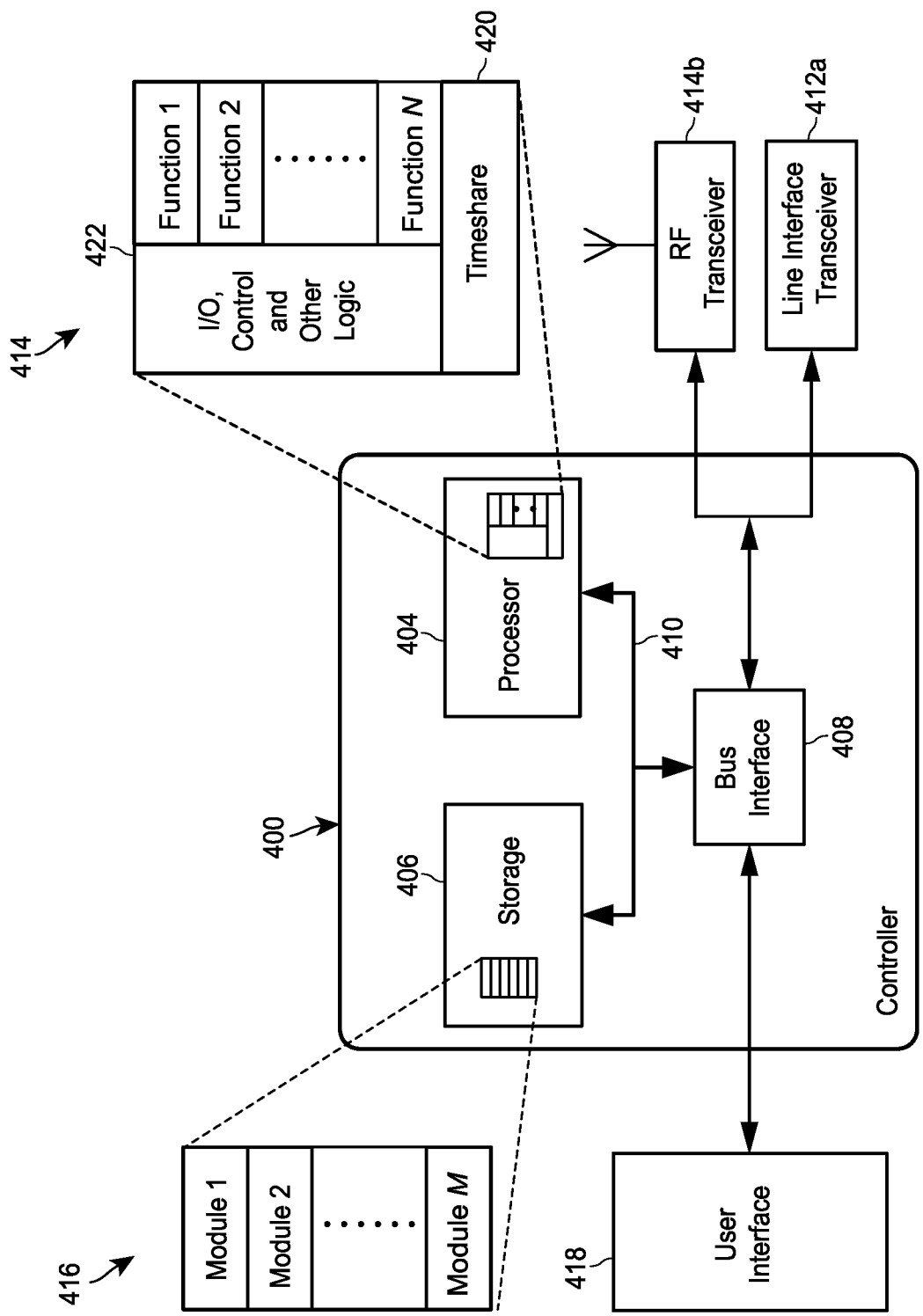
FIG. 4 illustrates a block diagram illustrating a simplified example of a hardware implementation of a controller in accordance with certain aspects disclosed herein.

FIG. 4 illustrates a block diagram illustrating a simplified example of a hardware implementation of a controller 400, such as any of the system controller 120, the charge controller 130, the vehicle charge controller 144, or the centralized management system 150 disclosed herein. In some embodiments, the controller 400 may be a controller of a site meter 22, an external battery system 30, or any other component disclosed herein that implements control logic to control any aspect of the described systems and methods. The controller 400 may include one or more processors 404 that are controlled by some combination of hardware and software modules. Examples of processors 404 include microprocessors, microcontrollers, digital signal processors (DSPs), application-specific integrated circuits (ASICs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 404 may include specialized processors that perform specific functions, which may be configured by one or more of the software modules 416. The one or more processors 404 may be configured through a combination of software modules 416 loaded during initialization and may be further configured by loading or unloading one or more software modules 416 during operation.

In the illustrated example, the controller 400 may be implemented with a bus architecture, represented generally by the bus 410. The bus 410 may include any number of interconnecting buses and bridges depending on the specific application of the controller 400 and the overall design constraints. The bus 410 links together various circuits including the one or more processors 404 and storage 406. Storage 406 may include memory devices and mass storage devices, any of which may be referred to herein as computer-readable media. The bus 410 may also link various other circuits, such as timing sources, timers, peripherals, voltage regulators, and power management circuits. A bus interface 408 may provide an interface between the bus 410 and one or more line interface circuits 412, which may include a line interface transceiver circuit 412a and a radio frequency (RF) transceiver circuit 412b. A line interface transceiver circuit 412a may be provided for each networking technology supported by the controller. In some instances, multiple networking technologies may share some or all of the circuitry or processing modules found in a line interface circuit 412, such as line interface transceiver circuit 412a for wired communication and RF transceiver circuit 412b for wireless communication. Each line interface circuit 412 provides a means for communicating with various other devices over a transmission medium. In some embodiments, a user interface 418 (e.g., touchscreen display, keypad, speaker, or microphone) may also be provided, and may be communicatively coupled to the bus 410 directly or through the bus interface 408.

A processor 404 may be responsible for managing the bus 410 and for general processing that may include the execution of software stored in a computer-readable medium that may include the storage 406. In this respect, the processor 404 of the controller 400 may be used to implement any of the methods, functions, and techniques disclosed herein. The storage 406 may be used for storing data that is manipulated by the processor 404 when executing software, and the software may be configured to implement any of the methods disclosed herein.

One or more processors 404 in the controller 400 may execute software. Software may include instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 406 or in an external computer readable medium. The external computer-readable medium and/or storage 406 may include a non-transitory computer-readable medium. A non-transitory computer-readable medium includes, by way of example, a magnetic storage device (e.g., hard disk, floppy disk, magnetic strip), an optical disk, a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. Portions of the computer-readable medium or the storage 406 may reside in the controller 400 or external to the controller 400. The computer-readable medium and/or storage 406 may be embodied in a computer program product. By way of example, a computer program product may include a non-transitory computer-readable medium in packaging materials. Those skilled in the art will recognize how best to implement the described functionality presented throughout this disclosure depending on the particular application and the overall design constraints imposed on the overall system.

The storage 406 may maintain software maintained or organized in loadable code segments, modules, applications, programs, etc., which may be referred to herein as software modules 416. Each of the software modules 416 may include instructions and data that, when installed or loaded on the controller 400 and executed by the one or more processors 404, contribute to a run-time image 414 that controls the operation of the one or more processors 404. When executed, certain instructions may cause the controller 400 to perform functions in accordance with certain methods, algorithms, and processes described herein.

Some of the software modules 416 may be loaded during initialization of the controller 400, and these software modules 416 may configure the controller 400 to enable performance of the various functions disclosed herein. For example, some software modules 416 may configure internal devices or logic circuits 422 of the processor 404, and may manage access to external devices such as line interface circuits 412, the bus interface 408, the user interface 418, timers, mathematical coprocessors, etc. The software modules 416 may include a control program or an operating system that interacts with interrupt handlers and device drivers to control access to various resources provided by the controller 400. The resources may include memory, processing time, access to the line interface circuits 412, the user interface 418, etc.

One or more processors 404 of the controller 400 may be multifunctional, whereby some of the software modules 416 are loaded and configured to perform different functions or different instances of the same function. For example, the one or more processors 404 may additionally be adapted to manage background tasks initiated in response to inputs from the user interface 418, the line interface circuits 412, and device drivers. To support the performance of multiple functions, the one or more processors 404 may be configured to provide a multitasking environment, whereby each of a plurality of functions is implemented as a set of tasks serviced by the one or more processors 404 as needed or desired. In one example, the multitasking environment may be implemented using a timesharing program 420 that passes control of a processor 404 between different tasks, whereby each task returns control of the one or more processors 404 to the timesharing program 420 upon completion of any outstanding operations or in response to an input such as an interrupt. When a task has control of the one or more processors 404, the processing circuit is effectively specialized for the purposes addressed by the function associated with the controlling task. The timesharing program 420 may include an operating system, a main loop that transfers control on a round-robin basis, a function that allocates control of the one or more processors 404 in accordance with a prioritization of the functions, or an interrupt-driven main loop that responds to external events by providing control of the one or more processors 404 to a handling function.

Other Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. No claim element is to be construed as a means plus function unless the element is expressly recited using the phrase "means for."

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Unless specifically stated otherwise, the term "some" refers to one or more. Likewise, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

Upon reading this disclosure, those of skill in the art will appreciate still additional alternative structural and functional designs for the systems and a methods disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A vehicle charging system for charging a vehicle, comprising:
    a power input port configured to receive alternating current (AC) input electric power from a power source at a first voltage ($V_1$);
    one or more batteries configured to receive a direct current (DC) input current derived from the AC input electric power received at the power input port and store electric power from the DC input current;
    a vehicle coupling configured to receive a DC charging current at a second voltage ($V_2$) derived from the one or more batteries and to provide an electrical interconnect between the vehicle charging system and the vehicle in order to provide the DC charging current to the vehicle;
    a resilient power subsystem configured to provide an AC operating current at a third voltage ($V_3$) derived from electric power stored in at least one of the one or more batteries to a plurality of system components within the vehicle charging system, wherein the system components are AC components powered by the AC operating current and configured to control operation of the vehicle charging system; and
    a system controller separate from the plurality of system components, comprising one or more processors configured to:
        control operation of the plurality of system components;
        obtain a controller operating current derived from the electric power stored in the one or more batteries during a time interval in which the AC input electric power is not being received from the power source; and
        control the vehicle charging system to provide the DC charging current to the electrical interconnect to charge the vehicle during the time interval.

2. The vehicle charging system of claim 1, wherein the resilient power subsystem comprises an operating current rectifier configured to generate the controller operating current from the AC operating current.

3. The vehicle charging system of claim 1, wherein the resilient power subsystem comprises a bidirectional inverter configured to: (i) in a first operating mode, convert the AC input power from the power source into the DC input current and (ii) in a second operating mode, convert a DC output current from the one or more batteries into the AC operating current.

4. The vehicle charging system of claim 3, wherein the resilient power subsystem is configured to provide the AC operating current by controlling the bidirectional inverter to operate in the second operating mode.

5. The vehicle charging system of claim 1, further comprising a rectifier configured to receive the AC input electric power and provide the DC input current to the one or more batteries.

6. The vehicle charging system of claim 1, wherein the resilient power subsystem comprises an inverter configured to convert a DC output current from the one or more batteries into the AC operating current.

7. The vehicle charging system of claim 1, wherein the plurality of system components comprise a plurality of temperature control components configured to maintain an internal temperature of the vehicle charging system within an operating range.

8. The vehicle charging system of claim 1, further comprising a primary power subsystem configured to provide the AC operating current to the plurality of system components during a second time interval in which the AC input electric power is being received from the power source, wherein the one or more processors of the system controller are further configured to:
    obtain the controller operating current derived from AC input electric power from the primary power subsystem during the second time interval;
    detect a triggering condition indicating the AC input electric power is not being received from the power source at the beginning of the time interval; and
    cause the resilient power subsystem to begin providing the AC operating current during the time interval in response to detecting the triggering condition.

9. The vehicle charging system of claim 1, further comprising:
    an inverter configured to convert a DC output current from the one or more batteries into an AC resilient power current at the first voltage ($V_1$), wherein the third voltage ($V_3$) is less than the first voltage ($V_1$); and
    a step-down transformer configured to (i) receive the AC resilient power current at the first voltage ($V_1$) and convert it into the AC operating current at the third voltage ($V_3$) during the time interval and (ii) receive the AC input electric power at the first voltage ($V_1$) and convert it into the AC operating current at the third voltage ($V_3$) during a second time interval in which the AC input electric power is being received from the power source.

10. The vehicle charging system of claim 1, wherein:
    the one or more batteries include a backup battery configured to store a charge at the third voltage ($V_3$); and
    the resilient power subsystem is configured to produce the AC operating current from the charge stored in the backup battery.

11. A method for charging a vehicle by a vehicle charging system, comprising:

receiving, at a power input port of the vehicle charging system, an alternating current (AC) input electric power from a power source at a first voltage ($V_1$) during a first time interval;

charging, by a direct current (DC) input current derived from the AC input electric power received at the power input port, one or more batteries of the vehicle charging system by storing a charge in the one or more batteries during the first time interval in which the AC input electric power is being received from the power source;

determining, by a system controller of the vehicle charging system, occurrence of a triggering condition indicating the AC input electric power is not being received from the power source; and in response to determining occurrence of the triggering condition, controlling, by the system controller, the vehicle charging system during a second time interval in which the AC input electric power is not being received from the power source to:

provide, via a vehicle coupling, a DC charging current at a second voltage ($V_2$) derived from the one or more batteries to the vehicle in order to charge a vehicle battery of the vehicle; and provide, by a resilient power subsystem, an AC operating current at a third voltage ($V_3$) derived from electric power stored in at least one of the one or more batteries to a plurality of system components within the vehicle charging system, wherein the system components are AC components powered by the AC operating current and configured to control operation of the vehicle charging system, and wherein the plurality of system components are separate from the system controller and are controlled by the system controller, and wherein the system controller obtains a controller operating current derived from the electric power stored in the one or more batteries during the second time interval in which the AC input electric power is not being received from the power source.

12. The method of claim 11, wherein the controller operating current is a DC controller operating current derived from the electric power stored in the one or more batteries.

13. The method of claim 12, wherein the resilient power subsystem comprises an operating current rectifier configured to generate the DC controller operating current from the AC operating current.

14. The method of claim 11, wherein the resilient power subsystem comprises a bidirectional inverter configured to:
(i) in a first operating mode, convert the AC input power from the power source into the DC input current and (ii) in a second operating mode, convert a DC output current from the one or more batteries into the AC operating current.

15. The method of claim 14, wherein the bidirectional inverter operates in the first operating mode during the first time interval and operates in the second operating mode during the second time interval.

16. The method of claim 15, further comprising:
controlling, by the system controller, the vehicle charging system during the first time interval in which the AC input electric power is being received from the power source to:
produce, by a primary power subsystem including the bidirectional inverter, a DC controller operating current from the AC input electric power; and
provide, by the primary power subsystem, the AC operating current to the plurality of system components.

17. The method of claim 11, wherein the resilient power subsystem comprises an inverter configured to convert a DC output current from the one or more batteries into the AC operating current.

18. The method of claim 11, wherein the plurality of system components comprise a plurality of temperature control components configured to maintain an internal temperature of the vehicle charging system within an operating range.

19. The method of claim 11, further comprising:
providing, by a primary power subsystem of the vehicle charging system, the AC operating current to the plurality of system components during the first time interval in which the input electric power is being received from the power source, wherein the primary power subsystem derives the AC operating current from the input electric power received from the power source.

20. The method of claim 11, wherein the resilient power subsystem comprises:
an inverter configured to convert a DC output current from the one or more batteries into an AC resilient power current at the first voltage ($V_1$), wherein the third voltage ($V_3$) is less than the first voltage ($V_1$); and
a step-down transformer configured to (i) receive the AC input electric power at the first voltage ($V_1$) and convert it into the AC operating current at the third voltage ($V_3$) during the first time interval and (ii) receive the AC resilient power current at the first voltage ($V_1$) and convert it into the AC operating current at the third voltage ($V_3$) during the second time interval.

\* \* \* \* \*